2,995,472
IMPREGNATED PAPERS AND THE PROCESS OF IMPREGNATING THEM

Edward J. Sweeney and Walter W. Toy, Philadelphia, Pa., and Paul J. McLaughlin, Moorestown, N.J., assignors to Rohm & Haas Company, Philadelphia, Pa., a corporation of Delaware
No Drawing. Filed Nov. 19, 1957, Ser. No. 697,325
9 Claims. (Cl. 117—155)

The present invention is concerned with the impregnation or saturation of paper or paper-like fibrous products for the purpose of producing improved paper sheets having increased flexibility, extensibility, and strength, and having good qualities of drape and hand.

It is known to impregnate papers with aqueous dispersions of emulsion polymers of methyl acrylate and ethyl acrylate. When poly(methyl acrylate) is employed, the impregnated paper shows an increased tensile strength, but a substantial loss in edge-tear strength. When poly(ethyl acrylate) is employed, there is a small loss in tensile strength accompanied by a considerable rise in edge-tear strength. These two polymers are characterized by other differences, particularly a difference in hardness which may also be associated with what is known as a "brittle-point" or with the second order transition temperature herein referred to as the $T_i$ value.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

Specifically, the poly(methyl acrylate) has a $T_i$ value of +17° C. which is relatively hard as compared to the poly(ethyl acrylate) having a $T_i$ value of −14° C.

In general, it has been found that the application of polymers having relatively harder characteristics than methyl acrylate accentuates the loss in edge-tear while increasing the rise in tensile strength; whereas the application of polymers having hardnesses between that of poly(methyl acrylate) and that of poly(ethyl acrylate) progressively lowers the gain in tensile strength that is obtained with poly(methyl acrylate) as the hardness decreases to that of poly(ethyl acrylate) where there is an actual loss in tensile strength as compared to the unimpregnated paper sheet. On the other hand, the application of polymers of progressively decreasing hardness from that of poly(methyl acrylate) to that of poly(ethyl acrylate) progressively reduces the loss in edge-tear until there is substantially no loss at a $T_i$ value of about +5° C. and then progressively increases the edge-tear strength to the maximum at the $T_i$ value of poly(ethyl acrylate) itself.

The variations in hardness of the polymers can, of course, be obtained by copolymerization of methyl acrylate will ethyl acrylate or of one of these monomers with such hardening polymers as methyl methacrylate or the like.

It has been found that as polymers are applied which have hardnesses progressively decreasing below that of poly(ethyl acrylate), the papers thus impregnated suffer a loss in tensile strength which progressively increases as the polymer becomes softer, whereas the improvement in edge-tear strength over that of the unimpregnated sheet progressively decreases as the polymer becomes softer. Thus, the application of poly(butyl acrylate) having a $T_i$ value of −45° C. has been found to lower the tensile strength of the paper by about 33% whereas the edge-tear strength is only about 20% greater than that of the unimpregnated sheet. In general, the incorporation of functional groups such as carboxylic acid groups into the methyl acrylate and ethyl acrylate polymers applied heretofore has been found to impart additional improvement in tensile strength particularly over that obtained by the polymers having the lower $T_1$ values such as poly(ethyl acrylate). However, this increase in tensile strength is accompanied by a considerable loss in edge-tear strength so that the application of a poly(ethyl acrylate) modified with carboxylic groups reduces the improvement in edge-tear strength that can be obtained with such polymer by over 50% and converts the loss in tensile strength obtainable by the application of poly(ethyl acrylate) into a mere 10% increase in tensile strength.

In accordance with the present invention, a surprising discovery has been made that when extremely soft polymers of acrylate type having $T_1$ values from −25° to −45° C. and having certain functional groups therein are applied for the impregnation or saturation of fibrous products of paper-like type, the loss in tensile strength that is normally accompanied by the application of such polymers is reduced to a remarkable degree and at the same time the edge-tear strength in most instances is increased over the edge-tear strengths that could be obtained from such soft polymers which do not contain the functional groups and in those instances where such increase does not occur, the paper suffers relatively little loss in edge-tear strength improvement.

The paper which is used as the starting material for the present invention is of the class called "impregnating" or "saturating" papers which are of porous character and have a thickness of about 5 to 250 mils. Their basis weight may be from 10 on up to about 100 pounds by which is meant the weight in pounds of 500 sheets having a dimension of 24" x 36". In general, the pulp used in making the paper will not have been beaten beyond a Canadian freeness of about 450. Generally, the paper will have been obtained from pulp beaten to a Canadian freeness of about 675 to 500. The paper may be made from all types of fiber stocks, especially those of poor quality, such as oak, poplar, and yellow birch, and those of extremely short fiber length, as well as those of long fiber length and of good quality derivation, such as from spruce and hemlock. A wide variety of fibrous cellulosic material used in the preparation of paper, board, moulded resin fillers, and the like may be used, such as kraft pulp, rag pulp, soda, sulfate, ground-wood, sulfite pulp and alpha pulp. Similarly, other forms of fibrous cellulose such as cotton linters, and the like may be employed. These materials may be used alone or in admixture with fibers from other sources, such as jute, hemp, sisal, strings, chopped canvas, and other material, either cellulosic or non-cellulosic, that may improve the impact resistance, mechanical strength or other properties of the formed or moulded impregnated material. The process of the invention is also adapted to improve the extensibility, edge-tear strength and tensile strength of papers formed from synthetic fibers, such as nylon and related polyamide fibers, and polymers of acrylonitrile, such as copolymers containing at least 75% to 90% by weight of acrylonitrile with other comonomers, such as vinyl acetate, vinyl chloride, vinyl pyridine, and esters of acrylic and methacrylic acid such as methyl methacrylate.

It is to be noted that the starting paper may be that obtained from bleached or unbleached kraft, bleached or unbleached sulfite, or bleached or unbleached semi-chemical pulps. In addition, the paper may be made from mixtures of cellulosic pulps with up to 10% and preferably containing 1 to 5% of other fibers, such as glass fibers or the synthetic fibers mentioned above.

For most purposes, it is preferred that the starting paper be unsized and generally free of resins. However, for some purposes, it may be desirable to employ as the starting paper sheet a porous high wet strength paper such as may be obtained by the use of 0.5 to 5% by weight, on the weight of the fibers, of a thermosetting aminoplast, such as a urea-formaldehyde resin, melamine-formaldehyde resin or methylolated ureido polymers, such as those obtained by the reaction of formaldehyde with polymers and copolymers of N-vinyloxyethyl-N,N'-ethyleneurea. Such wet strength papers are obtained in the conventional way by the introduction of one of the resins just cited into the pulp suspensions followed by sheeting and baking at temperatures of 210° to 400 F. for periods of about one-half hour to five or ten minutes respectively.

The functional units with which the invention is concerned are amide groups. The amide units with which the invention is concerned may be derived from acrylamide, methacrylamide, N-methylacrylamide, N-ethylacrylamide, N-methylmethacrylamide, and N-ethylmethacrylamide. The copolymers of the present invention are produced by copolymerization of a mixture of monomers comprising at least 25% by weight of a higher alkyl acrylate in which the alkyl group has at least 4 carbon atoms and 2–5% by weight of one of the monomers mentioned hereinabove containing the amide groups, with or without acrylates or methacrylates more particularly described hereinbelow. It appears that the polymerized units having the amide groups mentioned hereinabove also improve the adhesion of the polymer to the fibers of the paper and thereby impart better internal bonding strength to the impregnated papers obtained after drying thereof. These units may be termed adhesion-promoting units for that reason. It appears also that the presence of such units in the polymer accounts for the capability of the impregnated papers to be improved in respect to wet strength by a suitable heating operation such as by heating at temperatures in the range of 240° F. to about 350° F. for a period of about 5 minutes at the upper temperature to about one-half an hour to an hour at the lower temperature.

In general, the copolymers of the present invention contain from 2% to 5% by weight of the units containing amide groups mentioned hereinabove. More than 5%, such as up to 10% by weight, may be employed but ordinarily no improvement in benefits is obtained; and, in some cases, as discussed hereinafter, a loss in versatility is obtained when 5% is exceeded. The cooplymer also contains at least 25% by weight of the higher acrylate and may contain up to 98% thereof. The maximum degree of softness is obtainable when n-butyl acrylate is employed in the amount of 98% by weight. Instead of butyl acrylate, the polymer may contain other higher acrylates of alcohols having 4-18 carbon atoms such as secondary butyl, t-butyl, isobutyl, n-amyl, n-hexyl, cyclohexyl, 2-ethylhexyl, octyl, t-octyl, decyl, dodecyl, hexadecyl, and octadecyl acrylates. Besides having at least 25% of the higher acrylate from butyl to octadecyl, the copolymer may contain up to 73% by weight of lower acrylates such as ethyl acrylate, methyl acrylate, n-propyl acrylate, or isopropyl acrylate. It may also contain up to 16% by weight of a methacrylate such as methyl methacrylate, ethyl methacrylate, butyl methacrylate, or higher methacrylates up to octadecyl methacrylate. However, the amounts of these several acrylates and methacrylates are selected so that the $T_i$ of the copolymer obtained is within the range of —25° C. to —45° C. This is an essential condition in order to obtain the surprising combination of improved strengths pointed out hereinabove. One preferred group consists of the water-insoluble copolymers of mixtures of 25 to 98% by weight of butyl acrylate, 2 to 5% by weight of acrylamide, up to 73% by weight of a member selected from the group consisting of methyl and ethyl acrylate, and up to 16% by weight of a methacrylate of an aliphatic alcohol having 1 to 18 carbon atoms, the copolymer having a $T_i$ between —25° and —45° C.

The copolymer dispersion may be made by any of the conventional emulsion polymerization procedures. For example, the polymerization procedures disclosed in the passage of McLaughlin et al., U.S. Patent 2,790,736, column 4, lines 8 to 74, may be employed substituting the unsaturated amides mentioned hereinabove for the unsaturated acids of the patent. The passage of that patent just referred to is incorporated herein by reference.

The molecular weight of the copolymer may be from 100,000 to up to several million such as 2 to 10 million or higher.

To obtain proper saturation and impregnation, the polymer dispersion should not exceed a viscosity of 5 poises at the concentration in which it is applied at normal room temperature. Generally, it is preferred that the viscosity does not exceed about 2.25 poises as a maximum.

The copolymers containing amide groups may be applied at any pH from about 2 to 10 without concern as to excessive viscosity.

The amount of synthetic polymer applied to the paper may be within the range of 10 to 130% on the weight of fibers. The impregnation may be effected by dipping the sheet within the aqueous dispersion of the polymer, by spraying the aqueous dispersion on the sheet, by passing the sheet over a suction box above which the dispersion may be sprayed, by means of rollers, or by floating the sheet over the aqueous dispersion. Depending upon the thickness of the sheet being impregnated or saturated and upon the particular manner of application to the sheet, the concentration of the dispersion may be in the range of 5 to 60% by weight of polymer. Preferably the aqueous dispersion contains about 15 to 50% by weight of polymer. The impregnation may be effected in a period of time varying from about 7–10 seconds to several minutes in duration.

After impregnation to distribute the polymer substantially uniformly throughout the sheet, the latter may be subjected to drying. The temperature of drying may be from room temperature to 400° F. and the time may vary inversely with respect to the temperature such as from 10 seconds at the high temperature mentioned to 4–8 hours at the lower temperature. Preferably drying is effected at 180° to 212° F. The drying may be effected by means of infra-red lamps, radio frequency-induced currents, circulating air ovens, festoon driers, and in the latter two systems temperatures in the range of 140° to 300° F. are frequently employed.

The impregnated sheet obtained with copolymers containing amide groups has markedly improved tensile and tear-strengths as well as increased extensibility as compared with sheets impregnated with polymers lacking the amide groups but otherwise corresponding in constitution. When the amount of polymer applied is in the lower portion of the range, e.g., about 10 to 60% by weight of the fibers, and the sheet has not been pressed after the impregnation, the product is a permeable, water-resistant sheet in which the characteristics of paper have not been completely suppressed. However, if about 40% or more of polymer is applied to the sheet and the sheet is pressed as in calendering, the product is essentially a continuous plastic film or sheet formed by the polymer with the fibers reinforcing the polymer and embedded in it. If desired, a pigment or dye may be included in the impregnation dispersion to modify the color of the product.

The impregnated sheets may be used as backing for sandpaper, masking tape backing, washable book covers (in which they may be used with or without an additional finish), as decorative papers, map-making papers, as lamina in floor covering laminates, as imitation leather, as a gasketing material, as shelving papers, as interliners for shoes, shirts, and other garments, as tablecloths or doilies, as "high-energy" papers, as in wrapping papers or bags for packaging and shipping, as filter papers; electrical insulation papers.

In the following examples which are illustrative of the invention, the parts and percentages are by weight unless otherwise noted. In all examples, the Scott IP–4 tensile tester was used for measurement of tensile strength. The Finch attachment was used for edge-tear resistance measurements. All values for both tensile and edge-tear are in lbs./inch width. The "pickup" value given is the weight percent of polymer based on the dry weight of the saturating paper before impregnation. The abbreviations MD and CD refer to machine direction and cross direction (or transverse direction) respectively.

EXAMPLE 1

An aqueous dispersion of a polymer is prepared by the emulsion copolymerization of a mixture of 85 parts of n-butyl acrylate, 11 parts of methyl methacrylate, and 4 parts of methacrylamide in about 100 parts of water in the presence of 6 parts of a t-octylphenoxypolyethoxyethylene containing about 30 oxyethylene units, 0.2 part of ammonium persulfate, and 0.25 part of sodium hydrosulfite. After polymerization, the dispersion was diluted to 30% solids concentration. The copolymer, referred to as polymer A in Table I, had a $T_i$ of about $-25°$ C.

An impregnating paper obtained from a pulp beaten to a Canadian freeness of 630 cc. having low wet tensile strength (0.52 lb./inch width in machine direction and 0.38 lb./inch width in cross direction) and having a basis weight of 32 pounds was immersed in the 30% dispersion prepared above. After thorough impregnation, the sheet was passed between squeeze rollers to remove excess impregnant and dried in contact with a chromium-plated surface heated to a temperature of 210° F. It was then conditioned overnight at 74° F. and 50% relative humidity.

Another sheet was obtained in the same manner except that the monomers in the polymerization mixture consisted of 84.4 parts of n-butyl acrylate and 15.6 parts of methyl methacrylate and the copolymer obtained had a $T_i$ value of $-25°$ C.

Table I

| Saturant | Pickup, percent | Tensile Strength | | Edge-Tear Resistance | |
|---|---|---|---|---|---|
| | | MD | CD | MD | CD |
| Polymer A | 45 | 20.8 | 12.2 | 16.4 | 16.2 |
| Polymer B | 45 | 11.7 | 9.0 | 14.2 | 12.4 |

The sheets feel quite soft and have good drape qualities.

We claim:

1. A method which comprises impregnating throughout its thickness a porous fibrous sheet of 5 to 250 mils thickness formed of fibers having a Canadian freeness value of at least 450 with an aqueous dispersion having a pH between 2 and 10 and a viscosity at room temperature not exceeding 5 poises and containing 5 to 60% by weight of a water-insoluble copolymer of a mixture of 25 to 98% by weight of at least one acrylic acid ester of an aliphatic alcohol having 4 to 18 carbon atoms and 2 to 5% by weight of a monomer selected from the group consisting of acrylamide, methacrylamide, N-methylacrylamide, N-ethylacrylamide, N-methylmethacrylamide, and N-ethylmethacrylamide, said copolymer having a $T_i$ between $-25°$ and $-45°$ C., the units of the copolymer consisting essentially entirely of ester and amide units, the impregnation being controlled to deposit at least 10% by weight, based on dry fiber weight, of the polymer on the sheet, and subsequently drying the impregnated sheet.

2. A method as defined in claim 1 in which the initial sheet comprises cellulosic fibers unmodified by wet-strength resins.

3. A method as defined in claim 1 in which the initial sheet comprises cellulosic fibers modified by a resin imparting high wet-strength thereto.

4. A method as defined in claim 1 comprising the step of heating said impregnated sheet at some stage at a temperature between 210° and 400° F. for a period of time to set the polymer and render the dried product solvent-resistant.

5. A method which comprises impregnating throughout its thickness a porous fibrous sheet of 5 to 250 mils thickness formed of fibers having a Canadian freeness value of at least 450 with an aqueous dispersion having a pH between 2 and 10 and a viscosity at room temperature not exceeding 5 poises and containing 5 to 60% by weight of a water-insoluble copolymer of a mixture of 25 to 98% by weight of butyl acrylate, 2 to 5% by weight of acrylamide, up to 73% by weight of a member selected from the group consisting of methyl and ethyl acrylate, and up to 16% by weight of a methacrylate of an aliphatic alcohol having 1 to 18 carbon atoms, the units of the copolymer consisting essentially entirely of ester and amide units, said copolymer having a $T_i$ between $-25°$ and $-45°$ C., the impregnation being controlled to deposit at least 10% by weight, based on dry fiber weight, of the polymer on the sheet, and subsequently drying the impregnated sheet.

6. A method which comprises impregnating throughout its thickness a porous fibrous sheet of 5 to 250 mils thickness formed of fibers having a Canadian freeness value of at least 450 with an aqueous dispersion having a pH between 2 and 10 and a viscosity at room temperature not exceeding 5 poises and containing 5 to 60% by weight of a water-insoluble copolymer of a mixture of 25 to 98% by weight of butyl acrylate, 2 to 5% by weight of methacrylamide, up to 73% by weight of a member selected from the group consisting of methyl and ethyl acrylate, and up to 16% by weight of a methacrylate of an aliphatic alcohol having 1 to 18 carbon atoms, the units of the copolymer consisting essentially entirely of ester and amide units, said copolymer having a $T_i$ between $-25°$ and $-45°$ C., the impregnation being controlled to deposit at least 10% by weigh, based on dry fiber weight, of the polymer on the sheet, and subsequently drying the impregnated sheet.

7. A fibrous product comprising a sheet of fibers of 5 to 250 mils thickness formed of fibers having a Canadian freeness value of at least 450 and carrying distributed throughout the fibrous mass about 10 to 130% by weight, based on the dry fiber weight, of a water-insoluble copolymer of a mixture of 25 to 98% by weight of at least one acrylic acid ester of an aliphatic alcohol having 4 to 18 carbon atoms and 2 to 5% by weight of a monomer selected from the group consisting of acrylamide, methacrylamide, N-methylacrylamide, N-ethylacrylamide, N-methylmethacrylamide, and N-ethylmethacrylamide, the units of the copolymer consisting essentially entirely of ester and amide units, said copolymer having a $T_i$ between $-25°$ and $-45°$ C.

8. A fibrous product comprising a sheet of fibers of 5 to 250 mils thickness formed of fibers having a Canadian freeness value of at least 450 and carrying distributed throughout the fibrous mass about 10 to 130% by weight, based on the dry fiber weight, of a water-insoluble copolymer of a mixture of 50 to 98% by weight of butyl acrylate, 2 to 5% by weight of acrylamide, up to 48% by weight of a member selected from the group consisting of methyl and ethyl acrylate, and up to 16% by weight of a methacrylate of an aliphatic alcohol having 1 to 18 carbon atoms, the units of the copolymer consisting essentially entirely of ester and amide units, said copolymer having a $T_i$ between $-25°$ and $-45°$ C.

9. A fibrous product comprising a sheet of fibers of 5 to 250 mils thickness formed of fibers having a Canadian freeness value of at least 450 and carrying distributed throughout the fibrous mass about 10 to 130% by weight, based on the dry fiber weight, of a water-insoluble copolymer of a mixture of 50 to 98% by weight of butyl acrylate, 2 to 5% by weight of methacrylamide, up to 48% by weight of a member selected from the group consisting of methyl and ethyl acrylate, and up to 16% by weight of a methacrylate of an aliphatic alcohol having 1 to 18 carbon atoms, the units of the copolymer consisting essentially entirely of ester and amide units, said copolymer having a $T_1$ between $-25°$ and $-45°$ C.

References Cited in the file of this patent

UNITED STATES PATENTS

| | | |
|---|---|---|
| 2,754,280 | Brown | July 10, 1956 |
| 2,757,106 | Brown | July 31, 1956 |
| 2,759,900 | Caldwell | Aug. 21, 1956 |
| 2,765,228 | Jordan | Oct. 2, 1956 |
| 2,765,229 | McLaughlin | Oct. 2, 1956 |